(12) United States Patent
Moyer

(10) Patent No.: US 6,211,873 B1
(45) Date of Patent: Apr. 3, 2001

(54) METHOD AND APPARATUS FOR GRAPHICALLY REPRESENTING INFORMATION STORED IN ELECTRONIC MEDIA

(76) Inventor: Todd Moyer, 6 Stout Dr., Belle Meade, NJ (US) 08502

( * ) Notice: Subject to any disclaimer, the term of this patent is extended or adjusted under 35 U.S.C. 154(b) by 0 days.

(21) Appl. No.: 09/204,907

(22) Filed: Dec. 3, 1998

Related U.S. Application Data

(60) Provisional application No. 60/067,375, filed on Dec. 3, 1997.

(51) Int. Cl.[7] .................................................... G06F 19/00
(52) U.S. Cl. ............................................. 345/339; 345/333
(58) Field of Search .................................. 345/333, 334, 345/339, 342, 356, 964, 966, 970

(56) References Cited

U.S. PATENT DOCUMENTS

| | | | |
|---|---|---|---|
| 5,793,369 | * | 8/1998 | Atkins et al. .......................... 345/339 |
| 5,917,499 | * | 6/1999 | Jancke et al. .......................... 345/940 |

* cited by examiner

Primary Examiner—Raymond J. Bayerl
Assistant Examiner—Cao H. Nguyen

(74) Attorney, Agent, or Firm—Woodridge & Associates, P.C.; Richard C. Woodbridge

(57) ABSTRACT

Apparatus and methods for displaying dynamic electronic data are provided for a computer-based display system. The apparatus includes a display, a frame within the display for displaying the data and a measure along a first frame axis for indicating a value of the displayed data. Entity display areas, each containing one entity defined by five data points, are displayed within the frame in non-overlapping, fixed positions along a second frame axis. The five data points include: a current data point, represented by a marker and indicting a current value of the entity in the display, first and second end data points of a first data range relating to the entity, represented by a first range marker, and first and second end data points of a second data range relating to the entity, represented by a second range marker. A label associated with the entities is also displayed in a fixed position with respect to the entity display areas. In one method of the invention, the dynamic data is displayed in sequential frames wherein the current marker and first and second range markers move dynamically within the entity display area to reflect the changing data related to each entity.

55 Claims, 10 Drawing Sheets

Microfiche Appendix Included
(1 Microfiche, 70 Pages)

METHOD AND APPARATUS FOR GRAPHICALLY REPRESENTING INFORMATION STORED IN ELECTRONIC MEDIA

CROSS REFERENCE TO RELATED APPLICATIONS

The present application claims benefit of U.S. Provisional Patent Application No. 60/067,375, filed on Dec. 3, 1997 pending, the disclosure of which is incorporated by reference herein.

REFERENCE TO MICROFICHE APPENDIX

The present application includes a microfiche appendix consisting of one slide and 70 frames of computer program listings, according to the requirements of 37 CFR 1.96(c).

FIELD OF THE INVENTION

The present invention relates generally to apparatus and methods for graphically representing dynamic, electronic data on a computer monitor or other video screen. More particularly, the present invention is directed to apparatus and methods for displaying electronic data that varies over a range or a continuum, such as time. Further, the display of the present invention is capable of coherently displaying, for comparison purposes, numerous display members or entities on a single display, as well as showing the variation of the entity data over the continuum.

BACKGROUND AND OBJECTS OF THE INVENTION

Current computerized display technologies represent data which varies temporarily or spatially much the same way that mechanical methods have been used for many years. Examples of such previous mechanical approaches are illustrated by using a pen to record a variable on a moving piece of paper. These apparatus, for example, may involve the variation of a stylus along a first display axis while the paper beneath the stylus is moved at a metered rate along a second axis. Thus a two axis, two dimensional representation of data is produced. The output of these mechanical display apparatus and methods is a continuous line which varies along one axis to indicate the value of the entity being recorded by the stylus (e.g. the instantaneous temperature of a location) while showing the temporal or spatial variations of the data along a second, moving axis (e.g. per hour). These mechanical display apparatus and methods are limited, however, in that only a small number of display entities can legibly be shown along the stationary display axis. Further, the data's variation along the moving axis is limited by typical lengths of usable paper and/or screen display areas, particularly where the range of temporal or spatial data variation is large or where a large quantity of data is involved. In particular, it is difficult to show the maximum and minimum ranges of values attained over the entire data span, or any portion thereof, particularly where multiple display entities are shown. Stock prices, for example, are easily displayed with the value of the stock labeled along a first vertical axis and the time at which the stock is valued along a horizontal axis. In such a representation, however, only a limited number of stocks may be displayed on a single display before the number of stocks being displayed overwhelms the display, thereby making it unreadable. Further, the range of the stock price for a full temporal data span (e.g. for the last ten days) must be made by simultaneously "eyeballing" two range end points along the entire relevant portion of the moving axis, back to the stationary axis. Such a method of displaying data is inherently difficult to read and interpret.

A number of improved, computerized applications for displaying dynamic electronic data have been demonstrated. Most of these apparatus and methods, however, have approached the electronic display of such data in a manner similar to the previous paper-based apparatus and methods. In the graphical display of stock quotes, the price of individual stocks for each day is displayed along the vertical axis with the date and time for the particular value of the stock being indicated along the horizontal axis. Within each time segment, the variation of the price of the stock is represented by a single vertical bar, the end points of which denote the high and low values of the stock during that time period. These vertical bars are connected by horizontal bars that link the successive time periods, thereby creating a jagged edged representation of the rise and fall of the stock price over the full time period. In this representation, however, only one stock is capable of being conveniently displayed within the display area, since the vertical bars for different stocks are difficult to distinguish during each time period. Numerous minor modifications to the graphic representation may be made, such as the conversion of vertical lines for each time period to "solid" vertical "candles". However, the line density of these alternative graphical representations also precludes the intelligible display of numerous stock prices on a single display. Display congestion may result from the simultaneous display of multiple stocks. Multiple stocks which do not change appreciably over time hover around the 0% change indicated on the vertical axis. In this display, individual stock values are generally unreadable where they all converge around the same value.

Numerous other variations of computerized display apparatus and methods are also known. Bar charts, showing three dimensional, block-like electronic representations of time varying data can be shown in a bar chart form. In this format, a number of entities within each time period are indicated by solid, colored vertical bars. Other multiple entity electronic displays include pie charts, XY charts (in which one or more data sets are rendered as a series of unique symbols connected by lines within a two-axis, display area) and strip charts (in which the horizontal axis is divided into slots and each slot is occupied by the graphical representation of an entity's data value measured along the vertical axis for the particular slot (e.g. time period). However, as with the above-mentioned stock charts, a limited number of entities can be displayed with any of these charts before the display area becomes unintelligible.

A "box and whiskers" chart may also be used to graphically display electronic data. In the "box and whiskers" chart, the following data are displayed for each entity: a minimum data point, a maximum data point, various percentile indicators for the data within the range of the minimum and maximum, and outliers (i.e. statistically errant data). The data set and the above-listed display points for each entity can be shown as locations along a horizontal bar or line wherein the values for the data are displayed along the horizontal axis and the multiple display entities are stacked along the vertical axis. Once again, however, the "box and whiskers" becomes congested as the number of displayed entities is increased.

Various three-dimensional, graphical displays are also possible with present computer display technologies. One such representation is a cube-like, three-dimensional representation of data. In this representation, one horizontal axis is provided to order the entities and a second axis is provided to show one measure for the entities. Each entity is represented by a vertical bar (i.e. a third, vertical axis) which indicates a second value for the entity. Three-dimensional graphical representations may also be used to display varying data as an undulating "surface". Each of these three-dimensional, graphical representations, however, suffers the same limitations as the two-dimensional representations in that only a limited number of entities may be displayed within the display area before the display becomes congested.

Therefore, the need exists for apparatus and methods for achieving a compact, electronic, graphical display of dynamic electronic data in which numerous entities may be simultaneously displayed. Ideally, such a display would coordinate the layout of the graphical entities for ease of comparison as among themselves, as well as for comparison of each display entity along the "dynamic axis".

Additionally, it is an object of this invention to provide apparatus and methods for electronically displaying dynamic data in which the data is represented by data slices along a continuum and is sequentially presented to the computer display so as to illustrate the variation of the dynamic data for numerous entities over the continuum.

SUMMARY OF THE INVENTION

The present invention fulfills these needs by providing a computer-implemented method for displaying, over a period of time on a computer screen, a plurality of the entities each corresponding to a set of values. Means are provided for continuously displaying the entities over the period of time on the computer screen such that the entities are displayed in fixed positions along a first ordinant. Each of the values is expressed in a unit of measurement, the units of measurement being displayed over the period of time on the computer screen in a fixed position along a second ordinant. The time period of display for the entities comprises at least three consecutive time segments. Means are provided for displaying a first and second marker in a first fixed relationship with respect to the ordinants during only the first of the time segments. The first and second markers identify, respectively, a first value in a first and second sets of values, the first and second sets of values corresponding respectively to the first and second entities. Means are provided for displaying the first and second markers in a second fixed relationship with respect to the ordinants during only the second of the time segments, the first and second markers identify, respectively, a second value in the first and second sets of values. Means are further provided for displaying the first and second markers in a third fixed relationship with respect to the ordinants during only the third of the time segments, the first and second markers identify, respectively, a third value in the first and second sets of values.

In a preferred embodiment of the present invention, the computer-implemented display system further includes means for displaying a third and fourth marker in a fourth fixed relationship with respect to the ordinants only during the first time segment and identifying, respectively, a first pair of boundary values for each of the first and second entities. Means are provided for displaying the third and fourth marker in a fifth fixed relationship with respect to the ordinants only during the second time segment and identifying, respectively, a second pair of boundary values for each of the first and second entities. Means are also provided for displaying a third and fourth marker in a sixth fixed relationship with respect to the ordinants only during the third time segment and identifying, respectively, a third pair of boundary values for each of the first and second entities.

In another preferred embodiment of the present invention, the computer-implemented display system further comprises means for displaying a fifth and sixth marker in a seventh fixed relationship with respect to the ordinants during only the first time segment and identifying, respectively, a fourth pair of boundary values for the first and second entities. Means are provided for displaying the fifth and sixth markers in an eighth fixed relationship with respect to the ordinants during only the second time segment and identifying, respectively, a fifth pair of boundary values for the first and second entities. Means are provided for displaying the fifth and sixth markers in a ninth fixed relationship with respect to the ordinants during only the third time segment and identifying, respectively, a sixth pair of boundary values for the first and second entities.

In still another embodiment of the present invention, the computer implemented display system further includes a label for each of the entities in each time segment fixedly positioned along the first ordinant. In addition, the label may be colored so as to associate the label with its corresponding entity.

It is also preferable for the computer-implemented display system to represent the first and second markers with a horizontal bar. Further, the third and fourth markers of the present invention preferably comprise a vertical bar, while the fifth and sixth markers preferably comprise a vertical shaded area.

In another preferred embodiment of the present invention, a sequencer is provided for controlling the sequential display of the time segment and the data within them. The sequencer preferably comprises a set of control buttons including at least one forward button, for advancing the display of the data in a first direction along the time segments, at least one backward button, for advancing the display of the data in a second direction along the time segments, and a pause button for pausing the sequential display of the data in the time segments. The set of control buttons may further comprise a restart button for beginning the display at a start time segment, a reverse button for alternating between the first and second directions along the time segments, and a stop button for stopping the sequential display of the data in the time segments. The set of control buttons may further include a start tire segment selector for selecting a start time segment, a time segment number selector for selecting a number of replay time segments, and a replay button for replaying the display between the start time segment for the number of replay time segments.

In accordance with another aspect of the present invention, a computer-implemented method is provided for displaying a plurality of entities, each corresponding to one of a plurality of sets of values, over a period of time on a computer screen. Each value within the plurality of sets is expressed in a unit of measurement. The time period is comprised of at least three consecutive line segments. The method comprises the steps of: continuously displaying the entities during the time period on the computer screen in a fixed position along a first ordinant; continuously displaying the units of measurement during the time period on the computer screen in a fixed position along a second ordinant; displaying a first and second marker, only during the first time segment, in a first fixed relationship with respect to the ordinants and identifying, respectively a first value in a first and second sets of values, wherein the first and second sets of values correspond to a first and second entity. The method further comprises the steps of displaying the first and second marker, only during the second time segment, in a second fixed relationship with respect to the ordinants and identifying, respectively a second value in the first and second sets of values. The method also includes the step of displaying the first and second marker, only during the third time segment, in a third fixed relationship with respect to the ordinants and identifying, respectively a third value in the first and second sets of values.

In accordance with a preferred step of the present method, the additional steps of: displaying a third and fourth marker in a fourth fixed relationship with respect to the ordinants, only during the first time segment and identifying, respectively, a first pair of boundary values for the first and second entities; displaying the third and fourth marker in a fifth fixed relationship with respect to the ordinants, only during the second time segment and identifying, respectively, a second pair of boundary values for the first and second entities; and displaying the third and fourth marker in a sixth fixed relationship with respect to the ordinants, only during the third time segment and identifying, respectively, a third pair of boundary values for the first and second entities.

In accordance with yet another preferred embodiment of the present method, additional steps are included for: displaying a fifth and sixth marker in a seventh fixed relationship with respect to the ordinants, only during the first time segment and identifying, respectively, a fourth pair of boundary values for the first and second entities; displaying the fifth and sixth marker in an eighth fixed relationship with respect to the ordinants, only during the second time segment and identifying, respectively, a fifth pair of boundary values for the first and second entities; and displaying the fifth and sixth marker in a ninth fixed relationship with respect to the ordinants, only during the third time segment and identifying, respectively, a ninth pair of boundary values for the first and second entities.

In accordance with a preferred step of the present method, the computer-implemented display method includes the step of representing a range of values within the units of measurements with each of the first, second, third, fourth, fifth, and sixth pairs of boundary values. The present method may also include the step of sequencing the sequential display of the time segments in a first direction along the period of time. The method may also include the step of sequencing the sequential display of the time segments in a second direction along the period of time, the second direction being different from the first direction.

The method of the invention may also include the steps of: switching between the first and second directions along the period of time; starting the sequencing at a predetermined time segment; pausing or stopping the sequencing and varying the speed of the sequencing.

The method of the present invention preferably includes the steps of: displaying labels in associative relationship with each of the entities to identify the entities; displaying the first marker in a first color and the second marker in a second color; displaying the first and third markers in a first color and displaying the second and fourth markers in a second color; and displaying the fifth and sixth markers as a shaded area.

In accordance with another aspect of the present invention, a computer readable medium is provided for storing a set of instructions for controlling a digital computer and for displaying on a computer screen a plurality of entities represented by a plurality of sets of values, each value being expressed in a unit of measurement. Instructions for causing the computer to continuously display the entities during a period of time on the computer screen in a fixed position along a first ordinant are further included. The period of time comprises at least three consecutive time segments. Instructions for causing the computer to continuously display the units of measurement during the period of time on the computer screen in a fixed position along a second ordinant are provided. The instructions further cause the computer to continuously display, during only the first time segment, the first and second markers in a first fixed relationship with respect to the ordinants, the first and second markers identifying, respectively, a first value in a first and second sets of values corresponding to the first and second entities of the plurality of entities. Instructions are further included for causing the computer to continuously display, during only the second time segment, the first and second markers in a second fixed relationship with respect to the ordinants, the first and second markers identifying, respectively, a second value in the first and second sets of values. Instructions are also provided for causing the computer to continuously display, during only the third time segment, the first and second markers in a third fixed relationship with respect to the ordinants, the first and second markers identifying, respectively, a third value in the first and second sets of values.

In accordance with another aspect of the present invention, a computer-based display system for dynamically displaying quantitative data on a display is provided. The display system includes a frame within the display in which the data is displayed, a measure provided along a first frame axis for indicating a value of the display data, and at least one entity display area in a fixed position along a second frame axis such that the entity display areas are non-overlapping. Within each entity display area is displayed an entity, the entity being defined by at least five datum points. The five defining datum points comprise a current datum point, represented by a marker, a first and second end data points of a first data range, the first data range represented by a first range marker, and a first and second end data points of a second data range, the second data range represented by a second range marker. Further, a label associated with each entity is displayed in a fixed position with respected the entity display area.

In one embodiment of the present invention, the display system further comprises an associative characteristic, such as color, for the label, marker and first range marker.

In a preferred embodiment of the present invention, the computer-based display system includes data which is ordered along a continuum. The continuum is comprised of increments, and the current datum point for each entity represents at least one datum point within a current increment of the continuum.

In accordance with another aspect of the invention, the first data range comprises a first set of data points associated with a first set of sequential increments along the continuum, in which the first set of data points includes the current datum point. The second data range comprises a second set of data points associated with the second set of sequential increments, the second set of data points including the current datum point. In yet another embodiment, the continuum comprises a time line, and each increment of the continuum comprises a unit of time.

In still a further embodiment of the present invention, the current marker comprises a horizontal bar, the first range marker comprises a vertical bar, and the second range marker comprises a vertical shaded area.

Another preferred embodiment of the present invention includes a sequencer for displaying a sequence of frames, the sequencer being responsible for updating the five defining data points in each frame of the sequence so as to display data corresponding to successive current increments of the sequence. The sequencer may further comprise a controller for controlling the sequence of frames. The controller comprises a set of control buttons including: at least one forward button for advancing the sequence of frames along a first direction of the continuum, at least one backward button for advancing the sequence of frames along a second direction of the continuum, and a pause button for pausing the sequence of frames. In another preferred embodiment, the control buttons further include a restart button for beginning the sequence of frames at a start increment of the continuum, a reverse button for alternating between the first and second directions along the continuum, and a stop button for stopping the sequence of frames. The control buttons may further include an increment start selector for selecting a start increment along the continuum, an increment range selector for selecting a number of replay increments along the continuum, and a replay button for displaying the sequence of frames beginning at the start increment and including the number of replay increments.

In accordance with another aspect of the present invention, a computer-based method is provided for displaying quantitative data on a display. The method involves data which is comprised of data points representing at least one measure and which is ordered along a continuum having increments. The method comprises the steps of: framing the display area on the display, displaying the measure for the data along a first frame axis, and displaying at least one entity display area in non-overlapping fixed positions, along a second frame axis. The method further includes the steps of: displaying an entity within each of the entity display areas, the entity being defined by a set of entity data points; displaying a current datum point within each entity display area, the current datum point representing the measure of the entity within the current increment of the continuum; displaying a first data range related to the set of entity data points in the entity display area, the first data range being defined by a first and second end data point of the first data range; displaying a second data range related to the set of entity data points in the entity display area, the second data range being defined by a first and second end data points of the second data range; and labeling each entity display area.

In accordance with another aspect of the present method, the method further includes the steps of presenting a sequence of display areas and updating the current datum point, the first and second end data points of the first data range and the first and second end data points of the second data range so as to display the data corresponding to successive current increments of the sequence. Additionally, the method may include the step of advancing the current increment to a next increment in either a first or second direction along the continuum. Further included in the method of the invention is the step of switching the sequential presentation between the first and second directions along the continuum. The method of the current invention preferably includes the steps of: restarting the sequential presentation of display increments from a start display increment, pausing the sequential presentation of the display increments, and stopping the sequential presentation of the display increments.

In accordance with yet another aspect of the preferred invention, the method also includes the steps of: selecting a start increment, selecting a number of replay increments, and replaying the sequential presentation between the start increment for the number of replay increments.

The display method of the present invention may also include the step of associatively coloring at least the label and the entity.

In accordance with yet another aspect of the present invention, a computer readable medium for storing a set of instructions are provided to control a general purpose computer and an associated display. The set of instructions causes the computer to process data which is comprised of data points representing at least one measure. The data is ordered along a continuum having increments. The instructions include: instructions for causing the computer to frame a display area on the display, instructions for causing the computer to display the measure for the data along a first frame axis, and instructions for causing the computer to display at least one entity display area in non-overlapping, fixed positions ordered along a second frame axis. The set of computer instructions further includes instructions for causing the computer to display an entity within each of the entity display areas, the entity being defined by a set of entity datum points. The instructions further include: instructions for causing the computer to display a current datum point in each entity display area, the current datum point representing a measure of the entity within a current increment of the continuum; instructions for displaying a first data range related to the set of entity data points in the entity display area, the first data range defined by a first and second end data points of the first data range; instructions for displaying a second data range related to the set of entity data points in the entity display area, the second data range defined by a first and second end data points of the second data range; and instructions for displaying a label for each entity display area.

DETAILED DESCRIPTION OF A PREFERRED EMBODIMENT

Figure 1:
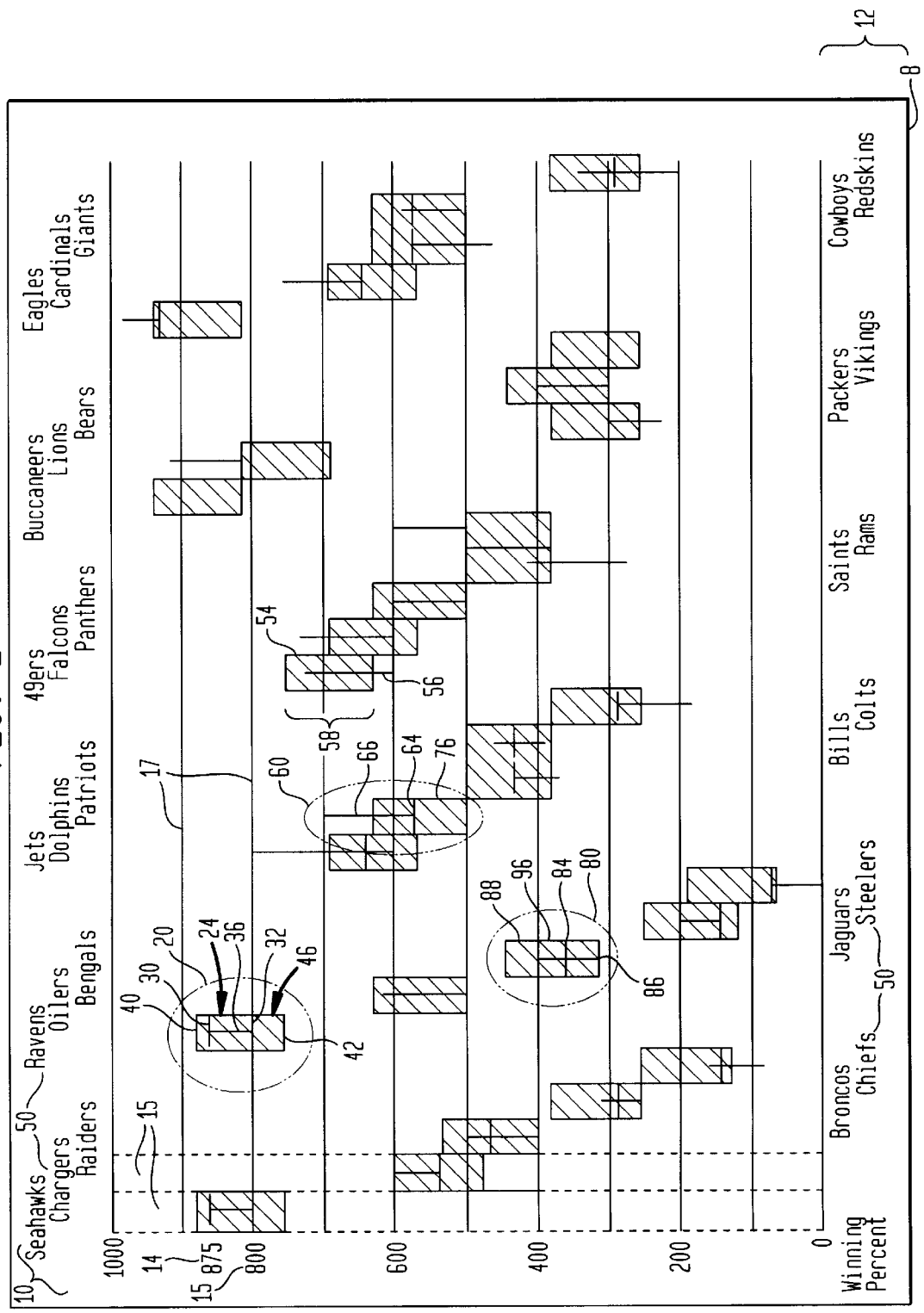
FIG. 1 is a screen display of several entities and their associated data accordance with a preferred embodiment of the present invention.

FIG. 1 shows a computer screen display of the present invention. The screen display is under the control of a computer with a microprocessor executing software that is designed to produce the display from electronically input data. Numerous entities, represented by the various football teams of FIG. 1, and data associated with each entity, represented by the horizontal and vertical markings beneath and above the team names, are shown. The computer-implemented display system includes a screen display 5 and a frame 8 within which the data and the entities are displayed. A first frame ordinant or axis 10 is located in a fixed position along the left-hand side of the display. Entity display areas 15 are displayed in non-overlapping, fixed positions along a second frame ordinant or axis 12. Entity display areas 15 are shown in FIG. 1 as vertical, strip-like areas extending from the bottom to the top of frame 8. Since the entity display areas are small in width, a number of them can be displayed within a single display frame without appearing congested. Along the first frame axis 10 are shown numbers or measures for indicating values of the data represented within each entity display area. In the particular embodiment of FIG. 1, for example, a winning percentage for the football teams is displayed on a scale of 0 to 1000. The horizontal hash marks and vertical bars and areas associated with each football team are easily read as corresponding to a value or measure by following the horizontal guide lines 17 from the hash or range end point across to the first axis. Labels 50 are displayed directly below or above their respective entity display areas 15 in fixed positions so as to associate and identify each entity display area. In the particular embodiment of FIG. 1, both the top and bottom frame axes are used to indicate the names of the different football teams that are displayed within each entity display area 15.

Entities 20, 60 and 80 are displayed within each entity display area 15. Each entity is representative of data that is associated with that entity. The full data represented in frame 8 may be subdivided into data sets, each set including the data values related to a particular entity. In the preferred embodiment of the invention, the entity data to be displayed within frame 8 are typically composed of digital data and represent values for each entity at different sampling points. The sampling points may be chosen to indicate a variation of the data along a continuum such as time or space. Such a continuum may be broken up into display segments, thereby allowing each frame to display the data representative of the entities during the same display segment. Past data, related to previous segments, or future data, related to possible future segments, may likewise be indicated by the entity. In FIG. 1, for example, the standings of all football teams after a given week of play are displayed.

Each entity, i.e. team, is represented by a horizontal line or marker 24, a vertical range marker 36 and a vertical shaded area 46. Horizontal marker 54 beneath the 49ers label, for example, indicates the winning percentage of the currently displayed game week as about 725. Vertical range marker 56 shows the movement of the 49ers winning percentage over the last two weeks, i.e. from the bottom point of about 600 two weeks ago to the current week's end value of about 725. Vertical range marker 58, shown in FIG. 1 as a shaded area, shows a range of possible finishing winning percentages for the 49ers between 625 and 750 as calculated by the processor from the 49ers data subset.

Entity 20 is displayed in a preferred embodiment shown in FIG. 1 and is representative of a subset of data associated with the entity labeled Ravens. Each entity is defined by at least five data points. A current datum point is represented in FIG. 1 as a marker or horizontal bar 24, and is continuously displayed to indicate the value of the entity within the currently displayed segment. Horizontal bar 24 can be correlated with value 14 to indicate the value of the current datum point during the current display segment. First and second end data points or boundary values, 30 and 32, are represented by a first range marker 36 which is shown in FIG. 1 as a continuously displayed vertical bar. In the particular embodiment of FIG. 1, the first range marker indicates a range of values, between 14 and 15, and are representative of a first data range, i.e. a subset of data points within the Ravens' subset of entity data. As shown in FIG. 1, the first range marker of the Ravens entity represents an upwardly progressing winning percentage along the last two time segments, i.e. weeks, from the second end point 32 to the current data point indicated by marker 24. In this fashion, rising or falling trends are easily demonstrated with first range marker 36 for the series of data points leading up to the current datum point represented by marker 24.

Each entity also includes first and second end data points or boundary values, 40 and 42, representative of a second data range, i.e. a second subset of data points within each subset of entity data. The second data range is represented by a second range marker 46. As mentioned above, the second range marker of the Ravens entity in FIG. 1 represents the possible future outcomes of the winning percentage, as calculated by the processor from the subset of Ravens data. Second range number 46 therefore indicates the potential progress of data along the next time segments, i.e. weeks, between the possible highest (first) end data point 40 to the lowest (second) end data point 42. In this fashion, an entity's anticipated rise or fall can be easily seen within frame 8 as demonstrated by second range marker 46.

Although specific examples have been given for the use of the first and second range markers and the entity data they represent, nothing precludes them from being used to represent any other subsets of existing or calculated entity data. In this regard, best selling books may be represented by the display of the present invention in the following manner. The current data point represented by the marker indicates the current position of the book on the best seller's list, while the first range indicator indicates the positions held by the book over the past 10 weeks and the second data range indicates all the historical positions occupied by the book.

Labels 50 are provided in fixed locations within frame 8, preferably along the second axis at the end of each respective entity display area 15. Color schemes or display fonts may be used to represent label 50 marker 24 and first range marker 36 so as to properly associate them as related information. Although not clearly seen in the black and white of FIG. 1, label 50, for the Ravens, associated marker 24 and first range indicator 36 are all of the same color. Further, all entities (teams) within the same league conferences are shown in the same colors so as to easily identify related entities. Likewise, label 50 marker 24 and first range marker 36 may be represented by an identifying font or character, e.g. an asterisk. Finally, second range marker 46 may be indicated as a gray "shadowed" area to provide visual "background texture" so as to not obscure the colors and rendering of marker 24 and first range marker 36.

Although specific examples have been given in which an associative color indicates an association between markers and entities, nothing precludes the; associative characteristic from indicating further information. In the above-mentioned application regarding the display of the best selling books, for example, color may be used to indicate the number of weeks on the best seller's list.

The data displayed on computer display 5 typically, but not necessarily, includes data which varies over a continuum such as time or space. In the example of FIG. 1, a single frame 8 represents the entity data at a given point in the continuum and shows the temporal or spatial variation only through the use of the first and or second range markers. As such, the continuum along which the data varies may be divided into increments, each increment representing a portion of the continuum, such as a day of time or a foot in length. So long as each increment of the continuum contains at least one datum point, or a datum point can be generated for each increment by the computer processor, the display of the current invention may be used to sequentially represent data which changes from one increment to the next.

Figure 2A:
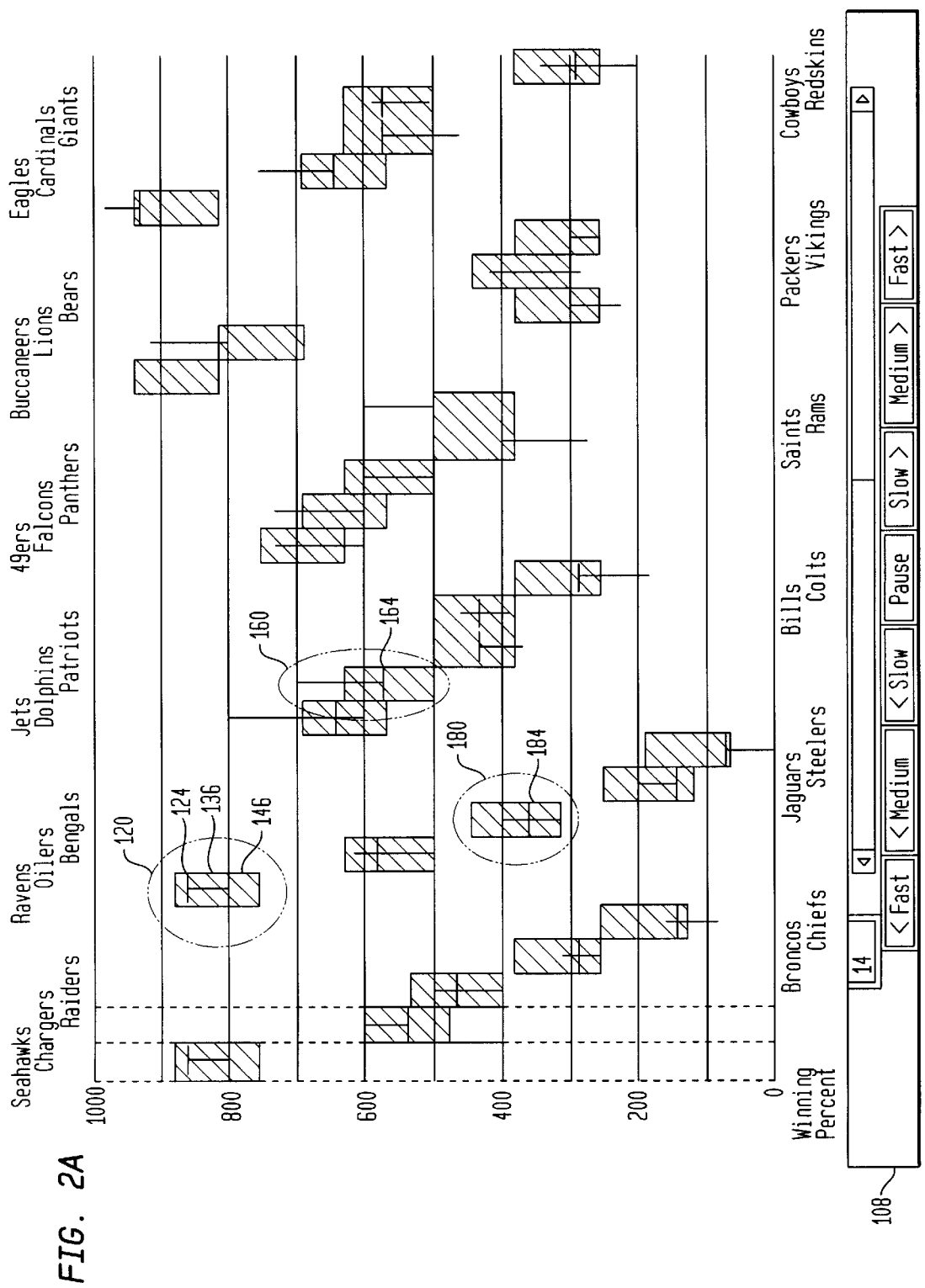
FIGS. 2A–2C illustrate a sequence of three successive screen displays representing dynamic data associated with the entities in each of three successive increments.
Figure 2B:
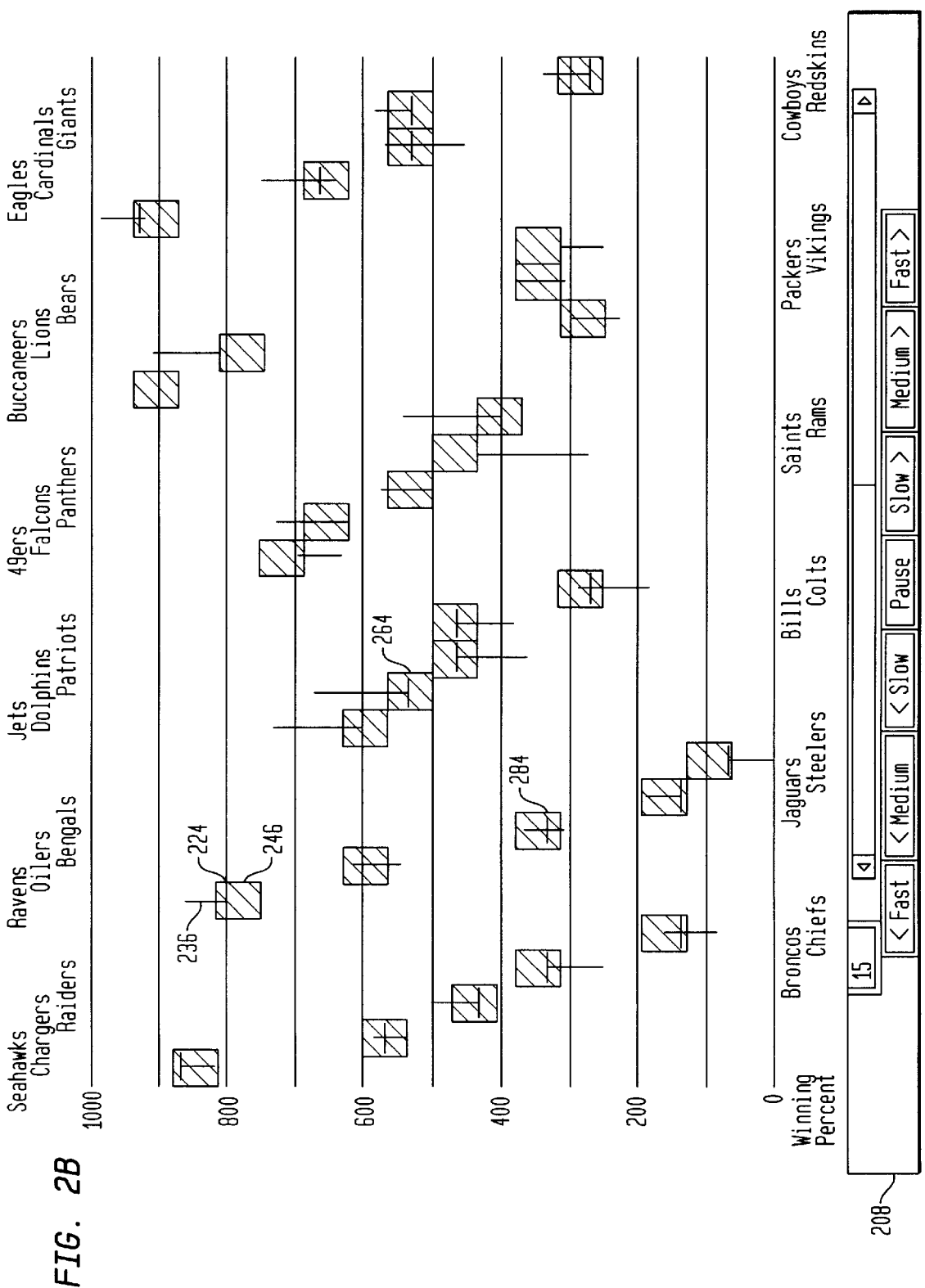
Figure 2C:
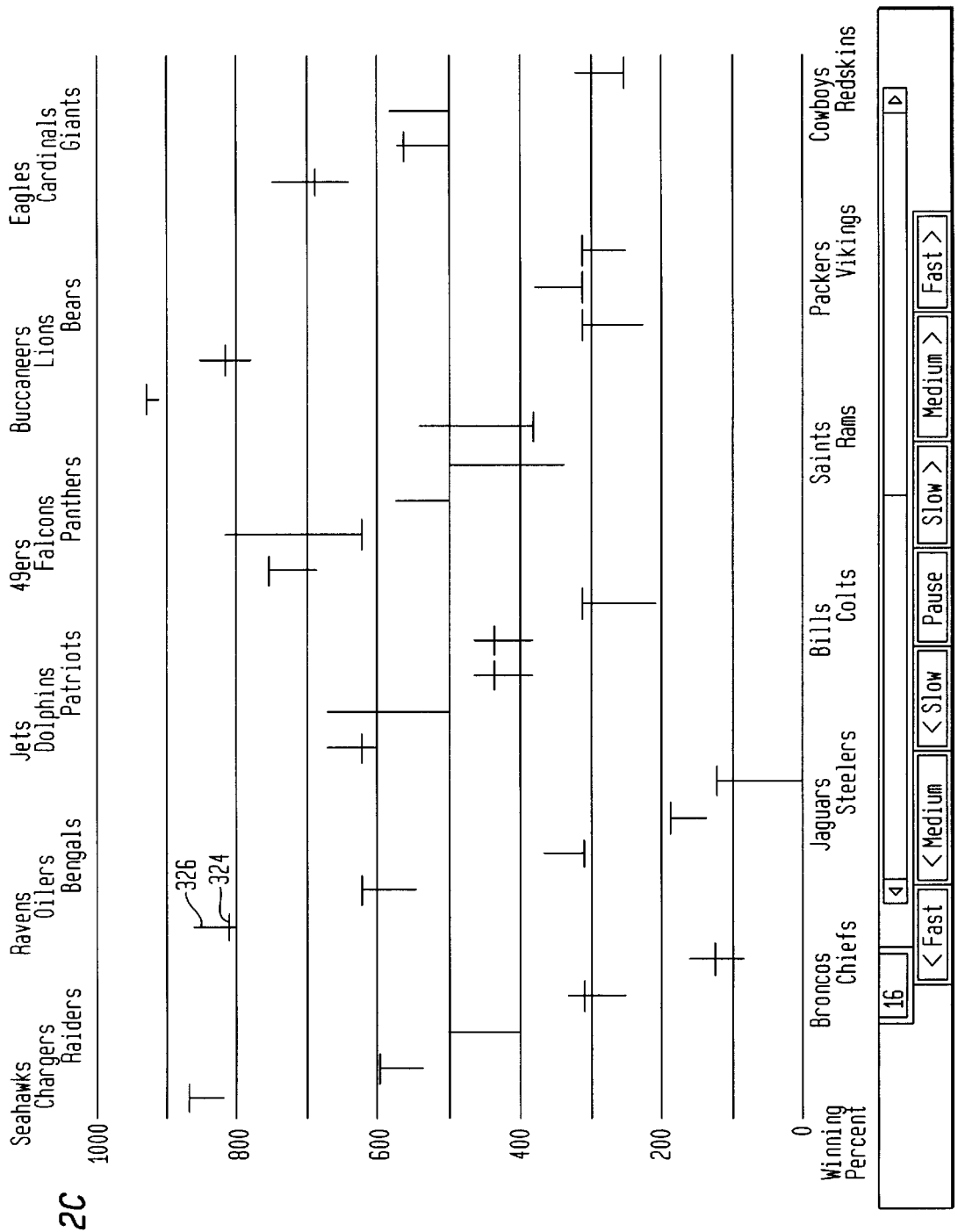

In this regard, FIGS. 2A–C show a sequence of three consecutive displays according to the one embodiment of the current invention. FIG. 2A shows the full data representation of all entities, and their associated plurality of sets of values, for a first increment along the continuum of time. In particular, each current marker 124, 164, 184 for each entity 120, 160, 180 shows the value, i.e. winning percentage of that entity, during that display time increment. FIG. 2B shows the full data representation of all entities, and their associated plurality of sets of values, for a second consecutive increment along the continuum, i.e. after the next game is played. As can be seen from the change in the display between FIGS. 2A and 2B, the successive current data points represented by markers 124, 164 and 184 are adjusted by the computer processor so as to accurately reflect the current data point with markers 224, 264 and 284 in the second frame 208 during the second time increment. Additionally, first and second range markers 236 and 246 have also been updated by the computer so as to accurately reflect the shift in relevant end data points between the two increments displayed in FIGS. 2A and 2B. In the particular example of FIG. 2B, first range marker 236 shows the winning percentage of the Ravens for the previous two games as modified from that shown in FIG. 2A to reflect the change in data from the first range marker 136, i.e. only the last two winning percentages of the entities are displayed in each frame. Likewise, second range marker 246 has also been updated, i.e. recalculated in this example, between frames 108 and 208 of FIGS. 2A and B so as to accurately reflect the remaining possible winning percentages for the teams.

In another embodiment of the current invention, a sequencer, programmed in software, is included for coordinating the display and calculations necessary to present the data in a sequence of display frames as shown in FIGS. 2A–2C. Consequently, each of the five defining data points are updated by the apparatus of the current invention so as to display data corresponding to the current increment within each frame of the sequential display of frames.

In the particular example shown in FIG. 2C, the second range markers are not shown since the final winning percentages are reached and there is no prospective calculated data.

According to another aspect of the present invention, a computer-implemented method is provided for displaying dynamic electronic data, the data comprising datum points each representing at least one measure. As described above, the data may vary over a over a continuum, such as time, and the continuum may have increments, such as days. As in FIG. 1, each frame of displayed data 8, therefore, represents the data associated with the at least one display member or entity 20 during that increment. According to the method, the computer first performs the step of framing a display area 8 on the display or computer monitor 5. A range of measures for estimating the value of the displayed data is then displayed along a first frame axis or ordinant 10. One or more entity display areas 15 are displayed in non-overlapping, fixed positions along a second frame axis or ordinant 12. One entity 20 is displayed within each entity display area 15 and is defined by a set of entity data points comprising a subset of the full set of data. A current datum point 24, calculated or actual, is displayed in each entity display area and represents at least one value of the entity within the current display increment of the continuum. A first data range 36 is also displayed. Data range 36 is related to the set of entity data and defined by first and second end points 30 and 32. A second data range 46 is also displayed. Second data range 46 is also related to the set of entity data and is defined by first and second end points 40 and 42. Finally, each entity is labeled with a label 50.

In a preferred step of the method of the current invention, a sequence of the above-mentioned frames are presented, wherein the step of presenting the sequence also includes the step of updating each marker in the display. In particular, the current datum point is changed to reflect each entity's value in the currently displayed increment within the frame, and the first and second end points of the first and second data ranges are updated to reflect the appropriate measures according to the particular implementation. In the example of FIGS. 2A, 2B and 2C, marker 124 is successively moved to the positions indicated by 224 and 324, the vertical bar 136, 236, 336 is adjusted to represent the range of winning percentages held by each team after the previous two games, and vertical shaded area, indicated by second range marker 146 and 246 is adjusted to represent the prospective range of finishing winning percentages for each entity. In the example of FIG. 2C, for example, the final winning percentages are shown for the football teams, and as such, the second data ranges shrink to zero since the current winning percentage is exactly the final winning percentage.

Figure 3A:
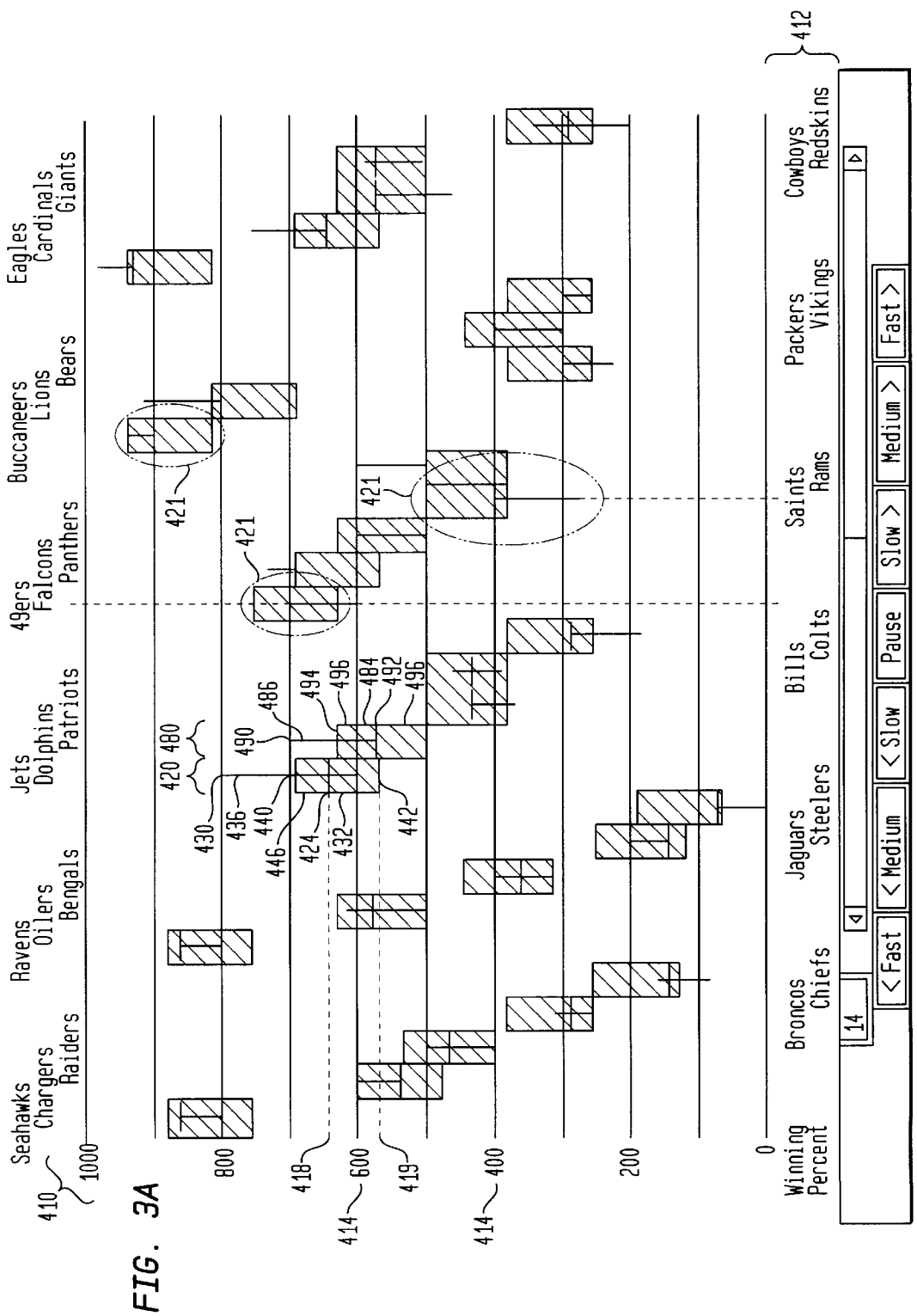
FIGS. 3A–3C illustrate another sequence of three successive screen displays representing the data associated with the entities in each of three successive increments.
Figure 3B:
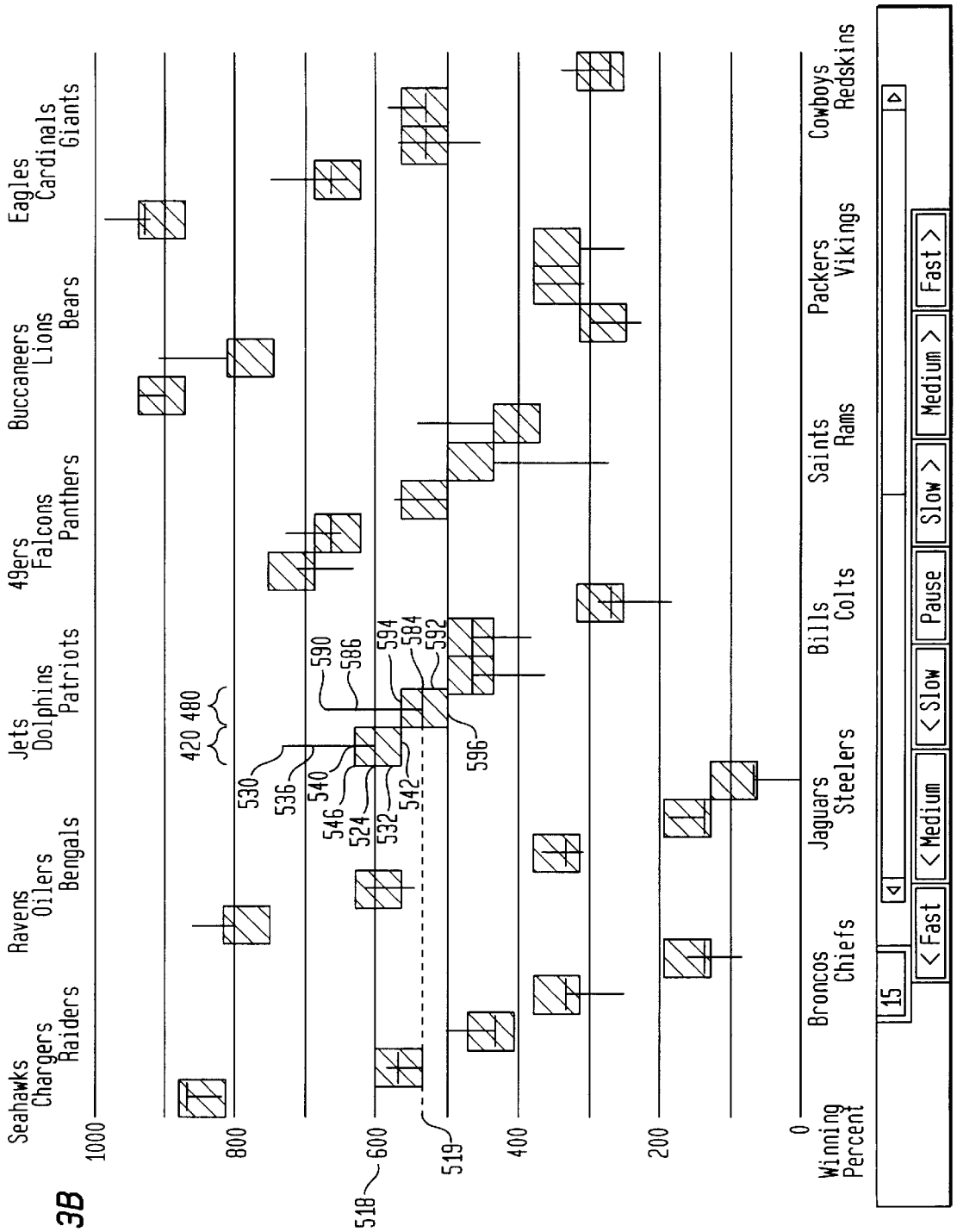
Figure 3C:
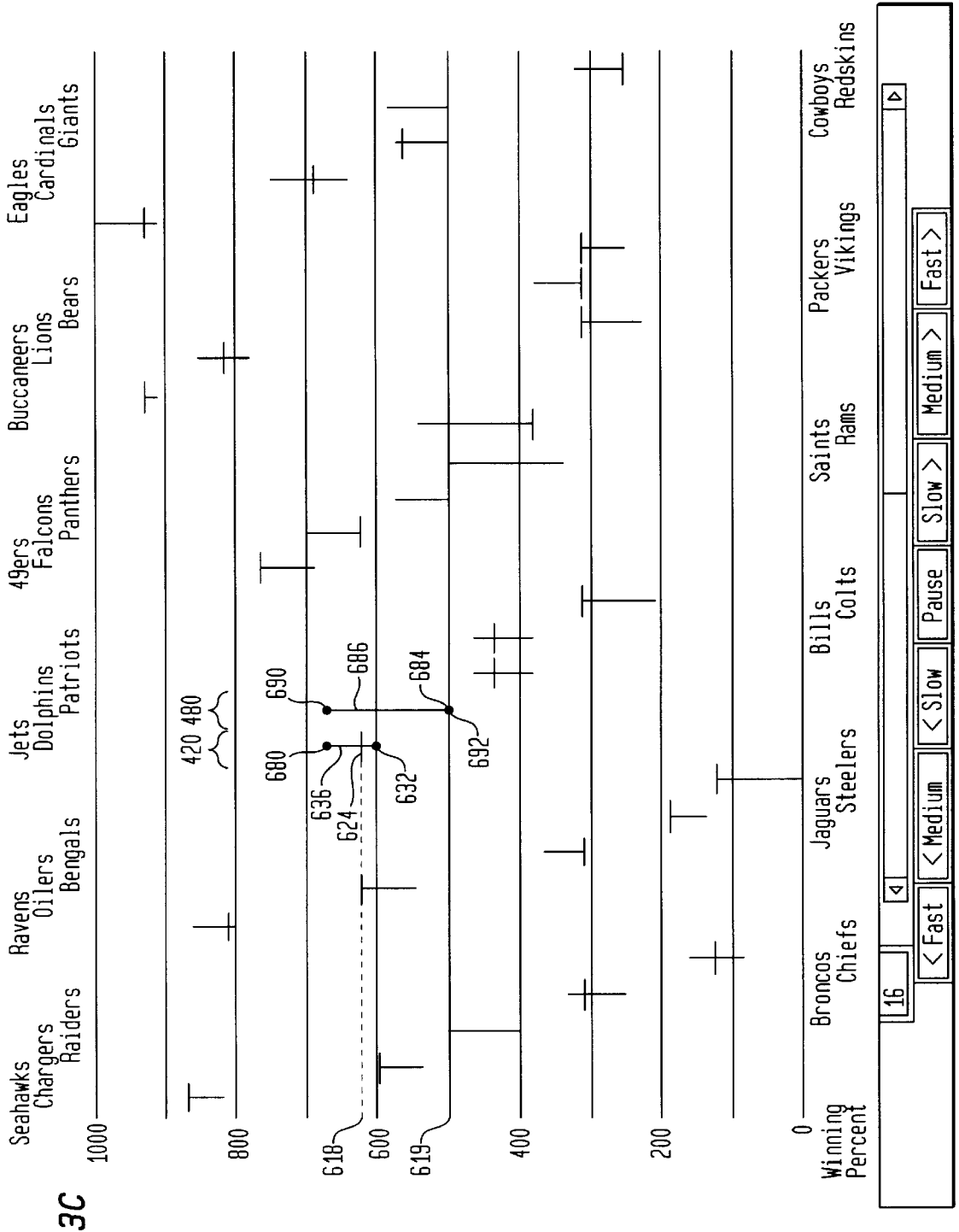

An alternative method according to the present invention is also provided. In particular, a computer-implemented method is provided for displaying a plurality of sets of values, each value being expressed in units of measurement and each set corresponding to one of a plurality of entities. As illustrated in FIGS. 3A, 3B and 3C the method consists of the step of continuously displaying a plurality of entities 421, including a first entity 420 and second entity 480, in fixed positions along a first ordinant 412 during a period of time consisting of at least three consecutive time segments, one each indicated in FIGS. 3A, 3B and 3C. The method further includes the steps of displaying units of measurement 414 in fixed positions along a second ordinant 410 during the period of time. During only the first time segment shown in FIG. 3A, first and second markers 424 and 484 are displayed in a first fixed relationship with respect to both ordinants and identify respectively, first values 418 and 419 in the first and second sets of values. The first and second sets of values correspond to the first and second entities 420 and 480 respectively. The method further comprises the step of displaying, during only the second time segment shown in FIG. 3B, the first and second markers 524 and 584 in a second fixed relationship with respect to both ordinants and identifying, respectively, second values 518 and 519 in the first and second sets of values. As shown in FIG. 3C, the method further comprises the step of displaying, during only the third time segment, the first and second markers 624 and 684 in a third fixed relationship with respect to both ordinants and identifying, respectively, third values 618 and 619 in the first and second sets of values.

According to a preferred step of the alternative method, a step is included for displaying a third and fourth marker, 436 and 486, in a fourth fixed relationship with respect to both ordinants and identifying a first pair of boundary values, 430 and 432, for the first entity 420 and a first pair of boundary values, 490 and 492, for the second entity 480 only during the first time segment shown in FIG. 3A. The preferred method further includes the step of displaying the third and fourth marker, 536 and 586, in a fifth fixed relationship with respect to both ordinants and identifying a second pair of boundary values, 530 and 532, for the first entity 420 and a second pair of boundary values, 590 and 592, for the second entity 480 only during the second time segment shown in FIG. 3B. Finally, the preferred method further includes the step of displaying the third and fourth markers, 636 and 686, in a sixth fixed relationship with respect to both ordinants and identifying a third pair of boundary values, 630 and 632, for first entity 420 and a third pair of boundary value, 690 and 692, for the second entity 480 only during the third time segment shown in FIG. 3C.

According to another preferred step of the alternative embodiment, a step is included for displaying a fifth and sixth marker, 446 and 496, in a seventh fixed relationship with respect to both ordinants and identifying a fourth pair of boundary values, 440 and 442, for the first entity 420 and a fourth pair of boundary values, 494 and 496, for the second entity 480 only during the first time segment shown in FIG. 3A. The preferred method further includes the step of displaying the fifth and sixth marker, 546 and 596, in an eighth fixed relationship with respect to both ordinants and identifying a fifth pair of boundary values, 540 and 542, for the first entity 420 and a fifth pair of boundary values, 594 and 596, for the second entity 480 only during the second time segment shown in FIG. 3B. Finally, the preferred method further includes the step of displaying the fifth and sixth markers in a ninth fixed relationship with respect to both ordinants and identifying a sixth pair of boundary values for the first entity 420 and a sixth pair of boundary values for the second entity 480 only during the third time segment shown in FIG. 3C. In the particular example of FIG. 3C, these last positions of the fifth and sixth markers and their associated boundary pairs are absent from the figure since the final wining percentages are determined in that particular frame of data.

As can be seen from the method of displaying the sequential data in FIGS. 3A, 3B and 3C, the fixed location of the entities facilitates the viewing of data across multiple time segments. Further, it is very easy to "eyeball" the changes in all the markers as the frames are sequentially presented, thereby giving an easily viewed method of displaying dynamic data. This data viewing is further facilitated since the entities occupy general fixed positions with respect to both ordinants.

Figure 4:
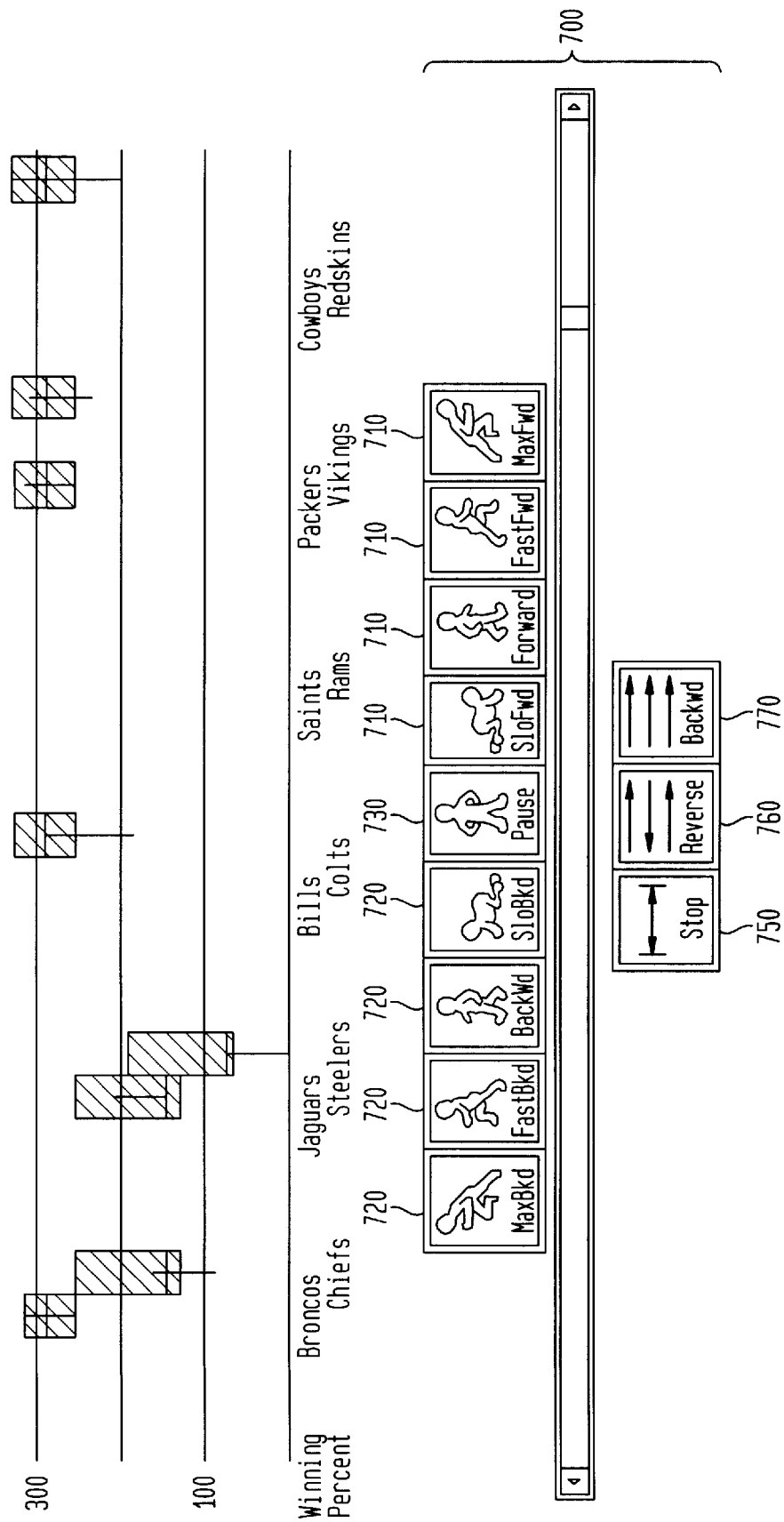
FIG. 4 depicts a screen display representation of a sequencer including control buttons in accordance with a preferred embodiment of the present invention.

According to another preferred embodiment of the current invention, FIG. 4 shows the sequencer and controller responsible for presenting the series of display frames containing the dynamic data. As with the preceding display apparatus and methods, the sequencer and controller are implemented in the software operating on the processor of the computer. The sequencer may be controlled with use of control panel 700. By controlling the sequence of frames presented on the display system of the current invention, the user or viewer of the display may customize the sequence of frames containing data for easier viewing or for taking particular note of data trends. In a preferred embodiment, controller panel 700 may comprise, for example, a set of control buttons 710–770 which may be "clicked" on the display to activate them. A pointing device, such as a computer mouse or trackball, may be used to perform the activation. In particular, forward buttons 310 and reverse buttons 320 may be provided for advancing the sequence of frames along a first direction of the continuum. In the example of FIGS. 2A–2C and 3A–3C, the forward buttons would advance each frame of winning percentage data one-frame-at-a-time to sequentially display the data after the fourteenth, fifteenth and sixteenth games. Backwards buttons 720 are likewise included to advance the sequencer frames along a second direction of the continuum, the second direction being different from the first. In the example of FIGS. 2A–2C and 3A–3C, the backwards buttons would advance each frame of winning percentage data, one-frame-at-a-time at varying speeds, to sequentially display the data after the sixteenth, fifteenth and fourteenth games.

In a further preferred embodiment of the present invention, pause button 730 is provided to pause the sequential presentation of data at a particular frame for ease of examination. Additionally, FIG. 4 shows that controller 770 may also comprise a "slide bar" which is activated by the pointing device and is used to display any desired frame of data at any particular point along the slide bar, the slide bar being representative of the continuum. Stop button 750 is included to stop the sequential display of frames. Reverse button 760 is provided to reverse the current direction of the sequential display along the continuum from the first to the second direction. Restart button 770 is included to cause the sequential display of frames to be reported form the beginning increment of the currently displayed direction along the continuum.

Figure 5:
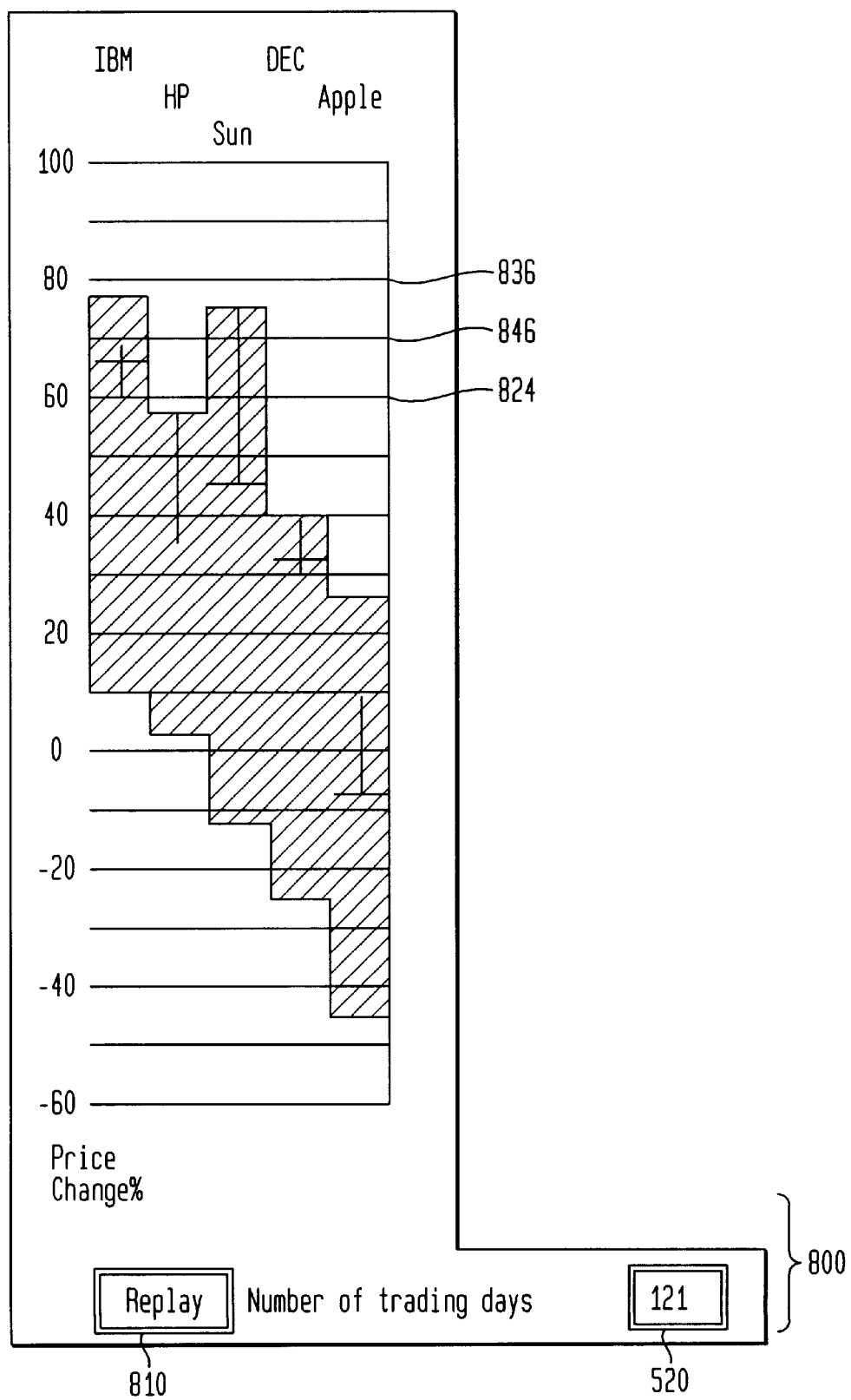
FIG. 5 depicts additional control buttons associated with the sequencer in accordance with a preferred embodiment of the present invention.

According to another preferred embodiment of the apparatus and method of the present invention, FIG. 5 illustrates additional functions contained within controller 800. In particular FIG. 5, shows the graphical representation of stock values for several stocks as measured against a percentage price change for a certain period of time. In this particular implementation, the current stock values are indicated by marker 824, first range marker 836 and second range marker 846. In the embodiment of FIG. 5, controller 800 includes replay button 810 for sequentially replaying a number of segments, and an increment range selector 820 for graphically inputting a number of increments (trading days in this example) to be displayed during the replay. Increment start selector (not shown) is provided as part of controller 800 for the user to input a trading day on which to start the replay. The replay sequence is then begun by graphically inputting the start trading day, the number of trading days to display in field 820 and then clicking replay button 810. The apparatus and method of the current invention then sequentially displays the data related to the time segments beginning at the starting increment and continuing for the number of increments indicated by the trading days selector 820.

The apparatus and methods of the present invention are particularly suited to the graphical display of digital data over the Internet or world-wide-web ("Web"). In particular, small computer programs, known as "applets", are resident on the computer server used to hold the display data. These programs are downloaded along with the data to the local computer. The "web browser" program, as part of viewing the web page containing the applet, invokes the downloaded applet to graphically depict the data embedded in that page. The data itself may be either downloaded from the internet to the local computer or streamed over the internet on a real-time basis to the computer.

Figure 6:
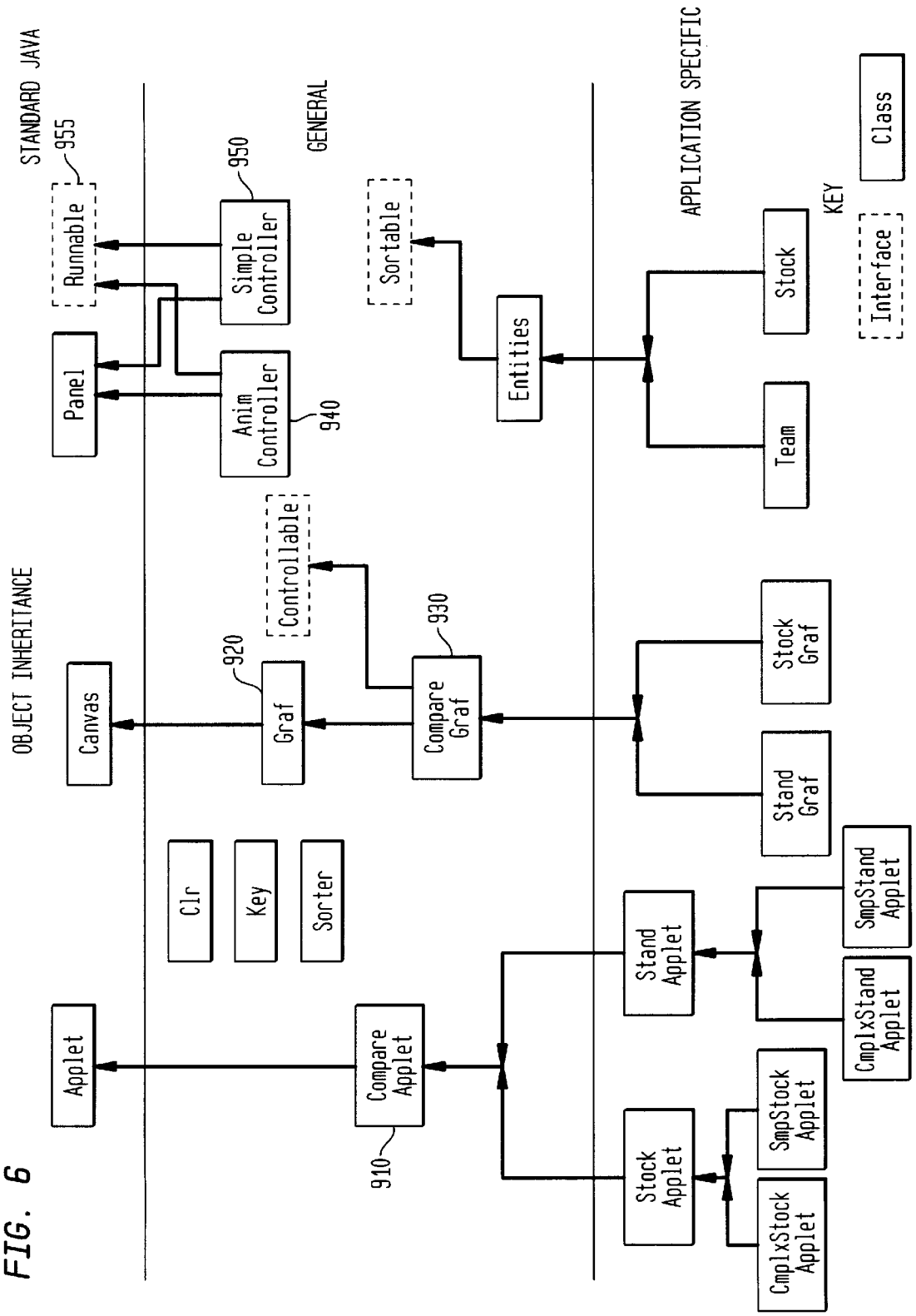
FIG. 6 depicts a block diagram of the software architecture in accordance with a particular embodiment of the present invention.

In FIG. 6, a high level software architecture diagram is provided showing the object inheritance of the object-oriented Java classes. The apparatus and methods of the present invention are implemented as computer software as listed in the Appendix and are intended to display information on any electronic device capable of rendering graphics dynamically. The Java programming language provides a suitable software structure for at least two reasons: 1) a large percentage of computing devices come equipped with a program known as a "web browser" that is capable of executing Java applets, and 2) Java is an object-oriented programming language. Object-oriented languages are superior in many respects to traditional "procedural" languages and offer advantages which facilitate the implementation of the present invention. However, those of skill in the art will recognize that the apparatus and method of the present invention can be programmed in almost any computer programming language, and as such, the present invention is not limited in any way to operate with a particular programming language or on a particular computer operating system.

In general, object-oriented programs are created by defining a number of "classes" each having a set of "methods". Classes are cohesive groups of data that represent an object or concept. Methods are all the ways a class may be asked to transform itself or the domain it functions in. The programs themselves are simply a set of specific instances of the classes that act on or react with their environment. For example, one could create a set of objects to monitor temperature, humidity, light and motion, and then use that information to control the environment within a home. In the present invention, objects exist for rendering data as a series of graphic images to create the effect of sequential ("animated") image.

The following four software procedures are used to produce the displays of the present invention: 1) assigning a range of X (horizontal) screen coordinates to each entity, 2) determining Y (vertical) screen coordinates for each value or measure, 3) drawing the frames using the X and Y values, and 4) controlling the sequential display of the frames. Each of these will now be explained in detail.

In assigning entities to horizontal ranges, the entities are first created and initialized with initial values and then sorted based on an application-specific sort value. Each of the sorted entities is assigned a sequential, equal-width range of X values (entity display area), beginning from the left frame margin. The entities' assigned X ranges remain fixed across all displayed frames so as to maintain visual continuity. Therefore, the only perceived movement during the sequence of frames is the changes in values for each entity.

In determining vertical screen coordinates for each value, a preferred implementation maps value locations to Y screen coordinates using a ratio of display height (in pixels) to the range of measured values. The following calculations give a value-to-screen-height scale:

$$pixels\_per\_unit\_value = display\_area\_height / (high\_display\_value - low\_display\_value);$$

and $$Y\_display\_value = (data\_value - low\_display\_value) * pixels\_per\_unit\_value$$

Since the Java programming language places higher Y pixel values lower on the screen, the Y_display_value calculation is compensated for as follows:

$$Y\_display\_value = ((high\_display\_value - data\_value) * pixels\_per\_unit\_value) + top\_margin$$

Once the axial markings and ranges are established the creation of the entity display follows. In a preferred implementation, one value and two ranges are depicted (a range being a high and low data pair), so that five data points are shown for each entity in each entity display area. Each single data point is drawn as a horizontal line at the Y coordinate representing its value, and spanning the allotted X space width. The first data range is drawn as a vertical line running between its defining high and low data values as given by the above equations. The second data range is drawn as a darker, rectangular area running between its defining high and low data values, and spanning the allotted X space width. All this can be drawn with only three X coordinates and five Y coordinates for each entity in each entity display area. The X coordinates are the left-most, right-most and center X values for each entity display area. The five Y coordinates are those corresponding to the present display value and the two high-low data pairs. The graphical drawings are performed using standard Java Graphics.drawLine and Graphics.fillRect methods.

The effect of sequential frame presentation is achieved by simply showing the individual frame images in succession. The object controlling the display can be simple or elaborate, but in either case, its function is to display single frames at regular intervals or in response to user actions.

"CompareApplet" class 910 of FIG. 6 is a central class for this implementation. The CompareApplet class is derived from the standard Java "Applet" class. Its role is to provide an interface between the web browser and the functions of the present invention. In particular, the CompareApplet class instantiates the necessary objects, and hands control off to the controller object. Principal among the instantiated objects are a set of entities. These entities are the subjects for which values are being displayed. For example, if the apparatus is displaying stock values, the entities would be the individual stocks. Each entity object holds its own data including: the set of related data values, the entity name, the entity category or association, the entity sort value, the three above-mentioned X coordinates, and the five above-mentioned Y coordinates. Each frame is drawn using the coordinates provided by the entity object to the Graf object as described below.

Graf class 920 in FIG. 6 is derived from Java's standard Canvas class, which is generally responsible for drawing lines, and shapes. The CompareGraf class 930 is derived or based on the Graf class. Together the two classes are used to draw the display frames and entities. The Graf builds on the Canvas's ability to draw to a rectangular section on a display. The functionality added by Graf to Canvas is primarily the ability to map item sort positions to X screen coordinates and item values to Y coordinates as described above. This functionality is handled in the xformX (transformX) and xformY methods shown in the above-mentioned equations. The _anchorToX and _anchorToY methods are used as building blocks to higher-level methods by positioning text or other rectangular regions relative to "anchor points".

Other Graf methods handle the actual drawing of the entities as described above. For example, the horizontal dashes, vertical lines, rectangular areas (including some 3-dimensional effects) and text are drawn with these methods. The remaining Graf methods draw the lines ("grids") and values ("marks") showing the Y scaling. The CompareGraf class encapsulates the interaction between the items and the Graf, and implements the controllable interface or the means by which the controller instructs the CompareGraf to draw the appropriate frame at the appropriate time. By invoking the CompareGraf's "draw" method with a specified frame number, for example, the controller causes the computer to "draw this frame number now."

Apart from initialization, CompareGraf does all its work in the "draw" method. The draw method erases the previous frame, draws each entity's rectangular (second data) range, and then each entity's vertical line (first data) range and marker (current data point) for the current display frame.

In the particular embodiment of FIG. 6, two controller classes are included: the full-featured AnimController 940, and the bare-bones SimpleController 950. The AnimControler allows the user to "play" the sequence of display frames forward or backward at various speeds. The SimpleControler allows the user to restart the animation from the beginning. Both are used to offer the user some degree of control over the sequential presentation of the frames. When implementing the "run" method dictated by Runnable interface 955, both controllers are programmed to draw successive display frames.

The previously-described classes form the building blocks of the apparatus and methods of the present invention. The majority of the setup and calculations for the displays are performed within the software objects themselves. CompareApplet 910 begins and orchestrates the overall execution of the objects. Upon user execution, the web browser will create one instance of the CompareApplet class 910, which will create a CompareGraf 930, as well as controllers, as part of its initialization. CompareApplet will also read its parameters or initialization data and create as many instances of Entities as dictated by the parameters. Once initialization is complete, the browser will invoke the applet's start method, which will transfer program control to the controller's "run" method. The controller will initiate the animation, instructing the CompareGraf to draw the frames at the appropriate times, and respond to user controls. This continues until the browser instructs the applet to stop.

Refinements to the above description may be made without deviating from the concept of the disclosed invention while making the implementation more practical. For example, performing the mapping of real-world data to screen coordinates while drawing the images results in longer image drawing times. However, by calculating screen coordinates at the beginning of execution, the images can be drawn more quickly, thereby enabling faster animation. In addition, simplification of the objects such as AnimController by reducing the supporting software that must be downloaded with the web pages results in faster page and data loading from the internet. Further, use of generic classes and parameters enables the apparatus and methods of the present invention to be applicable to a wide variety of displayed data and obviates the need for writing additional or new Java software for each new application. In this way, the software may be customized on the fly with customized parameter values loaded directly form the web page containing the applet. These and other refinements are possible in keeping with the objects of the invention.

The present invention provides a significant improvement over previous display technologies in its ability to illustrate data in context and highlight interesting values. Unlike the statistical graphics which are based on designs originally used for ink on paper, the present invention fully employs the video display's dynamic potential. The advantage of this approach, as shown in FIG. 2A–C and 3A–C is that it clearly presents far more information than the prior art apparatus and methods. Because each entity has its own small portion of the display space, fifty or more items can be displayed while easily remaining legible. Furthermore, by showing the data over time, the display of the present invention is virtually limitless in the amount of information that can be displayed in a given area. As an example, a display showing baseball standings, for example, may show nearly 25,000 data points clearly (5 data points for each of 30 teams over a 162 game season). The practical advantage of this volume of data is in facilitating comparisons across a set of entities and to show trends over time. Such a display of data would be prohibitively confusing or large by any of the above-mentioned prior art display methods. The present invention reflects the fact that the "data between the data points" is often more interesting than the data points themselves, or alternatively, comparing several values is far more informative than reading them individually.

Although the examples of FIGS. 1 and 2A–2C illustrate data related to the current standings for a set of football teams, there is no limitation as to the other types of data which may be displayed according to the apparatus of the present invention. In particular, any digital data stored in electronic media is capable of being effectively displayed by the display system and methods of the current invention. Below are just a few examples of the possible displays.

As previously described, a sports standings application shows the performance of teams (entities) over the course of a season as measured by winning percentage. The horizontal markers (current data points) show the current winning percentage after a given round of games. The vertical (first) range markers show winning percentages for each team through some number of previous games, say five for the NFL's 16-game season and ten for MLB's 162-game season. The background vertical (second) range marker shows the best and worst possible winning percentages for the season if all remaining games are won/lost respectively. The possible future wining percentages are calculated form the past team data. Each league division has its own color. Teams are sorted by division, and within each division, by the latest winning percentage.

A sports team ranking is also possible according to the display of present invention. In sports where rankings are important such as college football, current team rankings (current data points), could be shown by points awarded in the Associated Press poll over the course of a season. The foreground (first data) range shows the range of points awarded in several other polls, which are normalized for comparison. The background (second data) range shows points in the AP poll over the past several weeks or the whole season. Colors represent the conference to which each team belongs. Sorting along the display frame axis is by most recent points.

A cultural or best sellers application would show the NY Times fiction hardcover best sellers, for example. The display of the present invention would show the current position of books on the list (current data point) with the foreground (first data) range showing the position over the previous four weeks, and the background (second data) range showing positions occupied on any previous week. Sorting along the display frame axis would be by current position. Color could indicate weeks on the list, and therefore, might change from one week to the next.

A weather or temperature application may be set up any one of several different ways. For example, there are at least a few different ways to record and average daily high and low temperatures could be used to put current temperatures into perspective. In one, the past week, month or year's temperatures could be shown super-imposed over a background (second data) range with the first and second end points of the second data range showing record highs and lows and a foreground (first data) range of average daily temperatures for each date. Instead of a single, first range marker, this application could use a pair of individual markers similar to the single marker for the current data point to represent the actual high and low for each city for a given date. (Note that this implies six data points per entity instead of the usual five.) Color could be assigned to each city based on the actual high, with warmer colors indicating warmer temperatures. Cities could be sorted along the display frame axis by highest daily average high.

As a variation, the temperature application could use the above-mentioned record and average temperature ranges with the same cities and the same use of color and sort order. However, instead of playing actual highs and lows over a range of days, the display shows actual temperature over a range of hours. In this application, there would only be one marker for each city showing the current temperature, as contrasted with the pervious example's two markers for the daily high and low. The current temperature indicator (marker for current data point) would track actual temperature changes.

Stocks, bonds mutual funds or other financials prices may also be represented by the display apparatus and methods of the current invention. The price of the 30 companies comprising the Dow Jones Industrials could be shown over, for example, the past year. The end points of the foreground (first data) range could show the daily high and low, and the background (second data) range could show the 52 week high and low for each issue. Color could be used to show which industry a company belongs to, or simply to help distinguish a company from its neighbors. The companies could be sorted by percent change in price from the beginning of the display period to the present. Similarly, the same type of application could be done using a percent change in price as a measure along the first frame axis in place of actual price. Such a representation would facilitate comparisons between the stocks.

A world's richest people application according to the present invention shows the net worth of anyone who has been among the world's ten richest people over, say, the past ten years. The foreground (first data) range shows their net worth over the past three years, and the background (second data) range shows their worth over the ten year range. Color could be used to distinguish individuals, but those from the same family could be given the same color. These people could be sorted by current net worth.

Applications directed at social indicators, such as largest employers or median family incomes, could also be provided In the largest employer application, the number of people employed by the US's largest employers could be shown in a manner similar to the world's richest people. It could include any organization that has been among, for example, the top 15 employers at any time during the past 20 years. The foreground and background show high and low values over three and ten year ranges respectively. Color could be used to indicate industries, and sorting could be by current employment levels. In an application directed at median family income for the past 50 years, for example, a set of countries (entities) converted to a single currency and adjusted for inflation could be used. The foreground (first data) range shows income for those families in the middle 50% in terms of income (from 25% to 75%). The background range shows families from 10% to 90%. Color could indicate which continent the countries are on and sorting could be by current median income.

As yet another application of the current invention, political displays representing, for example, foreign aid may be created. The top 20 recipients of US foreign aid each year since 1930 could be shown. The foreground (first data) range shows high and low values for the past five years, and the background (second data) range shows high and low values for the entire time. Color could indicate which region the countries are in and sorting could be by current aid.

Further, another application is presented which uses a continuum other than time. For example, strength measurements may be displayed for 40 different steel alloys using the chromium percentage in the sample as the increment, varying from 2% to 4% by 0.1% increments. The foreground (first) range shows change from the previous increment, and the background (second) range shows the total range of strengths for the entire range of chromium content. Color could indicate type of steel: stainless, surgical, high carbon, spring, etc.

While particular embodiments and applications of the invention have been shown and described, it will be obvious to those skilled in the art that the specific terms and figures are employed in a generic and descriptive sense only and not for the purposes of limiting or reducing the scope of the broader inventive aspects herein. By disclosing the preferred embodiments of the present invention above, it is not intended to limit or reduce the scope of coverage for the general applicability of the present invention. Persons of skill in the art will easily recognize the substitution of similar components and steps in the apparatus and methods of the present invention.

What is claimed is:

1. A computer-implemented method for displaying over a period of time on a computer screen a plurality of sets of values, each such value being expressed in units of measurement, and each said set corresponding to one of a plurality of entities, said method comprising:

(a) displaying a representation for each of said entities during said period of time on said computer screen in a fixed position along a first ordinant of a set of first and second ordinants, said second ordinant of said set of ordinants being representative of said units of measurement, said period of time comprising at least three consecutive time segments;

(b) displaying, during only the first of said time segments, first and second markers in a first fixed relationship with respect to said ordinants and identifying, respectively, a first value in a first set of said sets of values, said first set corresponding to a first entity of said plurality of entities, and a first value in a second set of said sets of values, said second set corresponding to a second entity of said plurality of entities;

(c) displaying, during only the second of said time segments, said first and second markers in a second fixed relationship with respect to said ordinants and identifying, respectively, a second value in said first set and a second value in said second set; and (d) displaying, during only the third of said time segments, said first and second markers in a third fixed relationship with respect to said ordinants and identifying, respectively, a third value in said first set and a third value in said second set.

2. The computer-implemented method of claim 1, further comprising the steps of:

(a) displaying, during only the first of said time segments, third and fourth markers in a fourth fixed relationship with respect to said ordinants and identifying, a first pair of boundary values for said first entity and a first pair of boundary values for said second entity;

(b) displaying, during only the second of said time segments, said third and fourth markers in a fifth fixed relationship with respect to said ordinants and identifying, a second pair of boundary values for said first entity and a second pair of boundary values for said second entity; and (c) displaying, during only the third of said time segments, said third and fourth markers in a sixth fixed relationship with respect to said ordinants and identifying, a third pair of boundary values for said first entity and a third pair of boundary values for said second entity.

3. The computer-implemented method of claim 2, further comprising the steps of:
  (a) displaying, during only the first of said time segments, fifth and sixth markers in a seventh fixed relationship with respect to said ordinants and identifying, a fourth pair of boundary values for said first entity and a fourth pair of boundary values for said second entity;
  (b) displaying, during only the second of said time segments, said fifth and sixth markers in an eighth fixed relationship with respect to said ordinants and identifying, a fifth pair of boundary values for said first entity and a fifth pair of boundary values for said second entity; and
  (c) displaying, during only the third of said time segments, said fifth and sixth markers in a ninth fixed relationship with respect to said ordinants and identifying, a sixth pair of boundary values for said first entity and a sixth pair of boundary values for said second entity.

4. The computer-implemented method of claim 3, wherein each of said first, second, third, fourth, fifth and sixth pairs of boundary values represents a range within said units of measurement.

5. The computer-implemented method of claim 3, further comprising the steps of displaying said first and third markers in a first color, displaying said second and fourth markers in a second color, and displaying said fifth and sixth markers as a shaded area.

6. The computer-implemented method of claim 2, further comprising the steps of displaying at least said first and third markers in a first color, and displaying at least said second and fourth markers in a second color.

7. The computer-implemented method of claim 1, further comprising the step of sequencing the sequential display of said time segments in a first direction along said period of time.

8. The computer-implemented method of claim 7, further comprising the step of sequencing the display of said time segments in a second direction along said period of time, said second direction being different from said first direction.

9. The computer-implemented method of claim 8, further comprising the step of switching between said first and second directions along said period of time.

10. The computer-implemented method of claim 7, further comprising the step of starting said sequencing at a predetermined one of said time segments.

11. The computer-implemented display method of claim 7, further comprising the step of pausing said sequencing.

12. The computer-implemented display method of claim 7, further comprising the step of stopping said sequencing.

13. The computer-implemented method of claim 7, further comprising the step of varying the speed of said sequencing.

14. The computer-implemented method of claim 1, further comprising the step of displaying labels in associative relationship with each of said entities to identify said entities.

15. The computer-implemented method of claim 1, further comprising the step of displaying said first marker in a first color and displaying said second marker in a second color.

16. A computer-implemented display system for displaying over a period of time on a computer screen a representation of a plurality of sets of values, each value being expressed in units of measurement, each set of values corresponding to one of a plurality of entities, said display comprising:
  means for displaying said entities during said period of time on said computer screen in a fixed position along a first ordinant, said period of time comprising at least three consecutive time segments;
  means for displaying said units of measurement during said period of time on said computer screen in a fixed position along a second ordinant;
  means for displaying, during only the first of said time segments, first and second markers in a first fixed relationship with respect to said ordinants and identifying, respectively, a first value in a first set of said sets of values, said first set corresponding to a first entity of said plurality of entities, and a first value in a second set of said sets of values, said second set corresponding to a second entity of said plurality of entities;
  means for displaying, during only the second of said time segments, said first and second markers in a second fixed relationship with respect to said ordinants and identifying, respectively, a second value in said first set and a second value in said second set; and
  means for displaying, during only the third of said time segments, said first and second markers in a third fixed relationship with respect to said ordinants and identifying, respectively, a third value in said first set and a third value in said second set.

17. The computer-implemented display system of claim 16 further comprising:
  means for displaying, during only the first of said time segments, third and fourth markers in a fourth fixed relationship with respect to said ordinants and identifying, a first pair of boundary values for said first entity and a first pair of boundary values for said second entity;
  means for displaying, during only the second of said time segments, said third and fourth markers in a fifth fixed relationship with respect to said ordinants and identifying, a second pair of boundary values for said first entity and a second pair of boundary values for said second entity; and
  means for displaying, during only the third of said time segments, said third and fourth markers in a sixth fixed relationship with respect to said ordinants and identifying, a third pair of boundary values for said first entity and a third pair of boundary values for said second entity.

18. The computer-implemented display system of claim 17 further comprising:
  means for displaying, during only the first of said time segments, fifth and sixth markers in a seventh fixed relationship with respect to said ordinants and identifying, a fourth pair of boundary values for said first entity and a fourth pair of boundary values for said second entity;
  means for displaying, during only the second of said time segments, said fifth and sixth markers in an eighth fixed relationship with respect to said ordinants and identifying, a fifth pair of boundary values for said first entity and a fifth pair of boundary values for said second entity; and means for displaying, during only the third of said time segments, said fifth and sixth markers in a ninth fixed relationship with respect to said ordinants and identifying, a sixth pair of boundary values for said first entity and a sixth pair of boundary values for said second entity.

19. The computer-implemented display system of claim 18 wherein said fifth and sixth markers comprise a vertical shaded area.

20. The computer-implemented display system of claim 17 wherein said third and fourth markers comprise a vertical bar.

21. The computer-implemented display system of claim 16 wherein said display further comprises a label for each of said entities in each time segment at a fixed position along said first ordinate.

22. The computer-implemented display system of claim 21 wherein said display further comprises an identifying color for said marker and said label of each entity.

23. The computer-implemented display system of claim 16 wherein said first and second markers comprise a horizontal bar.

24. The computer-implemented display system of claim 16 further comprising a sequencer for controlling the sequential display of said time segments along said period of time.

25. The computer-implemented display system of claim 24 wherein said sequencer comprises a set of control buttons, said set of control buttons including:
  at least one forward button for advancing said display in a first direction along said time segments;
  at least one backward button for advancing said display in a second direction along said time segments;
  a pause button for pausing said display.

26. The computer-implemented display system of claim 25 wherein said set of control buttons further includes:
  a restart button for beginning said display at a start time segment;
  a reverse button for alternating between said first and second directions along said time segments;
  a stop button for stopping said display.

27. The computer-implemented display system of claim 25 wherein said set of control buttons further includes:
  a start time segment selector for selecting a start time segment;
  a time segment number selector for selecting a number of replay time segments;
  a replay button for replaying said display between said start time segment for said number of replay time segments.

28. A computer readable medium for storing a set of instructions for controlling a general purpose digital computer to display on a computer screen a plurality of sets of values, each value being expressed in units of measurement, and each said set corresponding to one of a plurality of entities, said instructions comprising instructions for causing the computer to:
  display said entities during said period of time on said computer screen in a fixed position along a first ordinant, said period of time comprising at least three consecutive time segments;
  display said units of measurement during said period of time on said computer screen in a fixed position along a second ordinant;
  continuously display, during only the first of said time segments, first and second markers in a first fixed relationship with respect to said ordinants and identifying, respectively, a first value in a first set of said sets of values, said first set corresponding to a first entity of said plurality of entities, and a first value in a second set of said sets of values, said second set corresponding to a second entity of said plurality of entities;
  continuously display, during only the second of said time segments, said first and second markers in a second fixed relationship with respect to said ordinants and identifying, respectively, a second value in said first set and a second value in said second set; and
  continuously display, during only the third of said time segments, said first and second markers in a third fixed relationship with respect to said ordinants and identifying, respectively, a third value in said first set and a third value in said second set.

29. A computer-based display system for dynamically displaying quantitative data, the display system comprising:
  a display for displaying said data;
  a frame in said display in which said data is displayed;
  a measure along a first frame axis for indicating a value of said displayed data;
  at least one entity display area, said entity display area being displayed in non-overlapping, fixed positions along a second frame axis;
  an entity displayed within each entity display area, said display entity being defined by at least five data points, said five data points comprising:
    a current datum point represented by a marker;
    a first and second end data points of a first data range, said first data range represented by a first range marker;
    a first and second end data points of a second data range, said second data range represented by a second range marker; and
  a label associated with said entity, said label displayed in a fixed position with respect to said entity display area.

30. The computer-based display system of claim 29 wherein at least said label, said marker and said first range marker have an associative characteristic.

31. The computer-based display system of claim 29 wherein said associative characteristic comprises a color.

32. The computer-based display system of claim 29 wherein said data is ordered along a continuum having increments, said current datum point representing at least one datum point within a current increment of said continuum.

33. The computer-based display system of claim 29 wherein said first data range comprises a first set of data points associated with a first set of sequential increments, said first set of data points including said current datum point.

34. The computer-based display system of claim 29 wherein said second data range comprises a second set of data points associated with a second set of sequential increments, said second set of data points including said current datum point.

35. The computer-based display system of claim 29 wherein said continuum comprises a timeline.

36. The computer-based display system of claim 35 wherein said increment of said continuum comprises a unit of time.

37. The computer-based display system of claim 29 wherein said current marker comprises a horizontal bar.

38. The computer-based display system of claim 29 wherein said first range marker comprises a vertical bar.

39. The computer-based display system of claim 29 wherein said second range marker comprises a vertical shaded area.

40. The computer-based display system of claim 29 wherein said display system further comprises a sequencer for displaying a sequence of frames, said sequencer updating said five defining data points in each frame of said sequence so as to display said data corresponding to successive current increments of said sequence.

41. The computer-based display system of claim 40 wherein said sequencer comprises a controller for controlling said sequence of frames.

42. The computer-based display system of claim 41 wherein said controller comprises a set of control buttons including:
   at least one forward button for advancing said sequence of frames along a first direction of said continuum;
   at least one backward button for advancing said sequence of frames along a second direction of said continuum;
   a pause button for pausing said sequence of frames.

43. The computer-based display system of claim 42 wherein said set of control buttons further includes:
   a restart button for beginning said sequence of frames at a start increment of said continuum;
   a reverse button for alternating between said first and second directions along said continuum;
   a stop button for stopping said sequence of frames.

44. The computer-based display system of claim 42 wherein said set of control buttons further includes:
   an increment start selector for selecting a start increment along said continuum;
   an increment range selector for selecting a number of replay increments along said continuum;
   a replay button for displaying said sequence of frames beginning at said start increment and including said number of replay increments.

45. A computer-based method for dynamically displaying quantitative data on a display, said data comprising datum points representing at least one measure, said data ordered along a continuum having increments, the method comprising the steps of:
   framing a display area on said display;
   displaying said measure for said data along a first frame axis;
   displaying at least one entity display area in non-overlapping fixed positions ordered along a second frame axis;
   displaying an entity within each of said entity display areas, said entity defined by a set of entity data points;
   displaying a current datum point in said entity display area, said current datum point representing said measure of said entity within a current increment of said continuum;
   displaying a first data range related to said set of entity data points in said entity display area, said first data range defined by a first and second end data points of said first data range;
   displaying a second data range related to said set of entity data points in said display area, said second data range defined by a first and second end data points of said second data range; and
   labeling said entity display area.

46. The computer-based display method of claim 45 wherein said method further comprises the step of presenting a sequence of said display areas, the step of presenting including the step of updating said current datum point, said first and second end data points of said first data range and said first and second end data points of said second data range so as to display said data corresponding to successive current increments of said sequence.

47. The computer-based display method of claim 46 wherein said method further comprises the step of advancing said current increment to a next increment in a first direction along said continuum.

48. The computer-based display method of claim 47 wherein said method further comprises the step of advancing said current increment to a next increment in a second direction, different from said first direction, along said continuum.

49. The computer-based display method of claim 46 wherein said method further comprises the step of switching said sequential presentation between said first and second directions along said continuum.

50. The computer-based display method of claim 46 wherein said method further comprises the step of restarting said sequential presentation of display increments from a start display increment.

51. The computer-based display method of claim 46 wherein said method further comprises the step of pausing said sequential presentation of display increments.

52. The computer-based display method of claim 46 wherein said method further comprises the step of stopping said sequential presentation of display increments.

53. The computer-based display method of claim 46 wherein said method further comprises the steps of:
   selecting a start increment;
   selecting a number of replay increments;
   replaying said sequential presentation between said start increment for said number of replay increments.

54. The computer-based method of claim 45 wherein said method further comprises the step of associatively coloring at least said label and said entity.

55. A computer-readable medium for storing a set of instructions for controlling a general purpose digital computer and an associated display, said set of instructions causing said computer to process data comprising data points representing at least one measure, said data ordered along a continuum having increments, said instructions comprising instructions for causing said computer to:
   frame a display area on said display;
   display said measure for said data along a first frame axis;
   display at least one entity display area in non-overlapping fixed positions ordered along a second frame axis;
   display an entity within each of said entity display areas, said entity defined by a set of entity datum points;
   display a current datum point in said entity display area, said current datum point representing said measure of said entity within a current increment of said continuum;
   display a first data range related to said set of entity data points in said entity display area, said first data range defined by a first and second end data points of said first data range;
   display a second data range related to said set of entity data points in said display area, said second data range defined by a first and second end data points of said second data range; and
   label said entity display area.

* * * * *